United States Patent
Schwam

(10) Patent No.: US 6,656,262 B1
(45) Date of Patent: Dec. 2, 2003

(54) PROCESS FOR MANUFACTURING A CEMENT/POROUS-ROCK COMPOSITE AND PRODUCT RESULTING THEREFROM

(76) Inventor: Paul A. Schwam, 2421 E. 5th St., Tucson, AZ (US) 85719

( * ) Notice: Subject to any disclaimer, the term of this patent is extended or adjusted under 35 U.S.C. 154(b) by 0 days.

(21) Appl. No.: 09/640,491

(22) Filed: Aug. 16, 2000

Related U.S. Application Data

(63) Continuation-in-part of application No. 09/081,952, filed on May 19, 1998, now abandoned.

(51) Int. Cl.$^7$ .................... C04B 14/14; C04B 14/16; C04B 18/06
(52) U.S. Cl. .................. 106/672; 106/679; 106/705; 106/709; 106/DIG. 1
(58) Field of Search .................. 106/672, 679, 106/705, 709, DIG. 1

(56) References Cited

U.S. PATENT DOCUMENTS

| | | | |
|---|---|---|---|
| 3,764,357 A | * 10/1973 | Bowles | |
| 3,904,377 A | 9/1975 | Honda et al. ............. 29/180 R |
| 4,040,852 A | 8/1977 | Jones ......................... 106/97 |
| 4,116,705 A | * 9/1978 | Chappell ............... 106/DIG. 1 |
| 4,212,682 A | 7/1980 | Burkett ..................... 106/288 |
| 4,572,864 A | 2/1986 | Benson et al. ........... 428/305.5 |
| 5,268,028 A | * 12/1993 | Fifield ........................ 106/726 |
| 5,292,366 A | 3/1994 | Miceli ....................... 106/708 |
| 5,465,547 A | 11/1995 | Jakel ............................ 52/518 |
| 5,718,758 A | 2/1998 | Breslauer .................... 106/698 |
| 5,772,751 A | 6/1998 | Nisnevich et al. .......... 106/679 |
| 5,776,244 A | 7/1998 | Ahrens ....................... 106/737 |
| 5,849,075 A | 12/1998 | Hopkins et al. ............ 106/705 |

* cited by examiner

Primary Examiner—Paul Marcantoni
(74) Attorney, Agent, or Firm—Antonio R. Durando; Durando Birdwell & Janke

(57) ABSTRACT

A process for binding porous-rock particles with cement, wherein the rock is saturated in water prior to mixing with the cement. The saturation step causes water to fill the voids in the porous structure of the rock such that, during mixing of the wet rock with cement, cement particles adhere to the surface of the rock but are mostly precluded from reaching void spaces in the rock. As a result of this procedure, the interstitial water is available from within the rock for the cement hydration process, thereby providing a more uniform curing step than otherwise available, and a greater proportion of the cement is appropriately placed on the outer surface of the particles for bonding. The resulting aggregate is stronger than obtained by conventional mixing processes. In addition, because of the voids left in the composite after the cement has cured and the interstitial water has been either used by the hydration process or has evaporated, the material also exhibits improved insulating properties.

16 Claims, 3 Drawing Sheets

PROCESS FOR MANUFACTURING A CEMENT/POROUS-ROCK COMPOSITE AND PRODUCT RESULTING THEREFROM

RELATED APPLICATIONS

This is a continuation-in-part application of U.S. Ser. No. 09/081,952 filed on May 19, 1998, now abandonded

BACKGROUND OF THE INVENTION

1. Field of the Invention

This invention is related in general to construction materials and, in particular, to a process for manufacturing an aggregate of cement and particulate porous-rock material.

2. Description of the Prior Art

Cement is used to bind particulate matter, such as sand and gravel, in order to produce strong composites used routinely in the construction of buildings and other structures. In particular, cement is also combined with various kinds of porous rocks, like volcanic cinder, scoria and pumice, to produce light-weight composites that can be used advantageously for applications where weight and thermal insulating properties are considered important. Because of the porous nature of the rock, the resulting composite tends to be lighter and, for some applications, more practical than conventional concrete for construction purposes. In addition, the interstitial voids in the rock provide an insulating barrier to thermal conductivity that makes the composite less sensitive to and more stable under normal thermal expansion cycles. These advantages render these types of aggregates particularly attractive as construction material in arid and hot climates.

The universal and conventional way of preparing these composite materials consists of mixing the rock particles and the cement in essentially dry conditions in a batch reactor and then gradually adding an amount of water sufficient to reach the desired degree of hydration, full hydration being the preferred objective. As one skilled in the art would readily recognize, the percentages of each component may be varied within allowable ranges to change the texture, fluidity and/or other characteristics of the resulting slurry. The structural strength of the composite produced by forming the slurry is a function of its composition and the conditions under which the hydration and curing stages of the cement are carried out.

One common problem of light-weight composites produced from porous rock particles and cement with respect to conventional concrete structures is their lower compressive strength, which limits the applications for which they can be used in spite of the desirability of their thermal properties and lower weight. Accordingly, there is still a need for a stronger, light-weight composite produced from cement and porous rock. This disclosure is directed at an improved, novel process for manufacturing such aggregate materials.

BRIEF SUMMARY OF THE INVENTION

One objective of this invention is a process for making cement/porous-rock aggregates that have greater compressive strength than found in similar composites manufactured by conventional mixing processes.

Another objective is a process that results in a composite with improved thermal insulating properties.

Another goal of the invention is a method of manufacture of cement/porous-rock composites that is suitable for continuous mixing.

Still another goal is a process that is particularly useful with scoria, cinder and bottom ash.

Another object is a process that is also particularly suitable for producing concretes made with scoria, cinder and bottom ash having low slump characteristics immediately prior to placement.

A final objective is a process that can be implemented easily and economically with commercially available materials and manufacturing equipment, modified only to the extent necessary to fit the requirements of the invention.

Therefore, according to these and other objectives, the present invention consists of a process for binding porous-rock particles with cement, wherein the rock is saturated in water prior to mixing with the cement powder. The saturation step causes water to fill the voids in the porous structure of the rock such that, during mixing of the wet rock with cement, cement particles adhere to the surface of the rock and are mostly precluded from reaching void spaces in the rock. As a result of this procedure, the interstitial water is available from within the rock for the cement hydration process, thereby providing a more uniform curing step than otherwise available, and a greater proportion of the cement is appropriately placed on the outer surface of the particles for bonding. The resulting aggregate is stronger than obtained by conventional mixing processes. In addition, because of the voids left in the composite after the cement has cured and the interstitial water has been either used by the hydration process or has evaporated, the material also exhibits improved insulating properties.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

Figure 1:
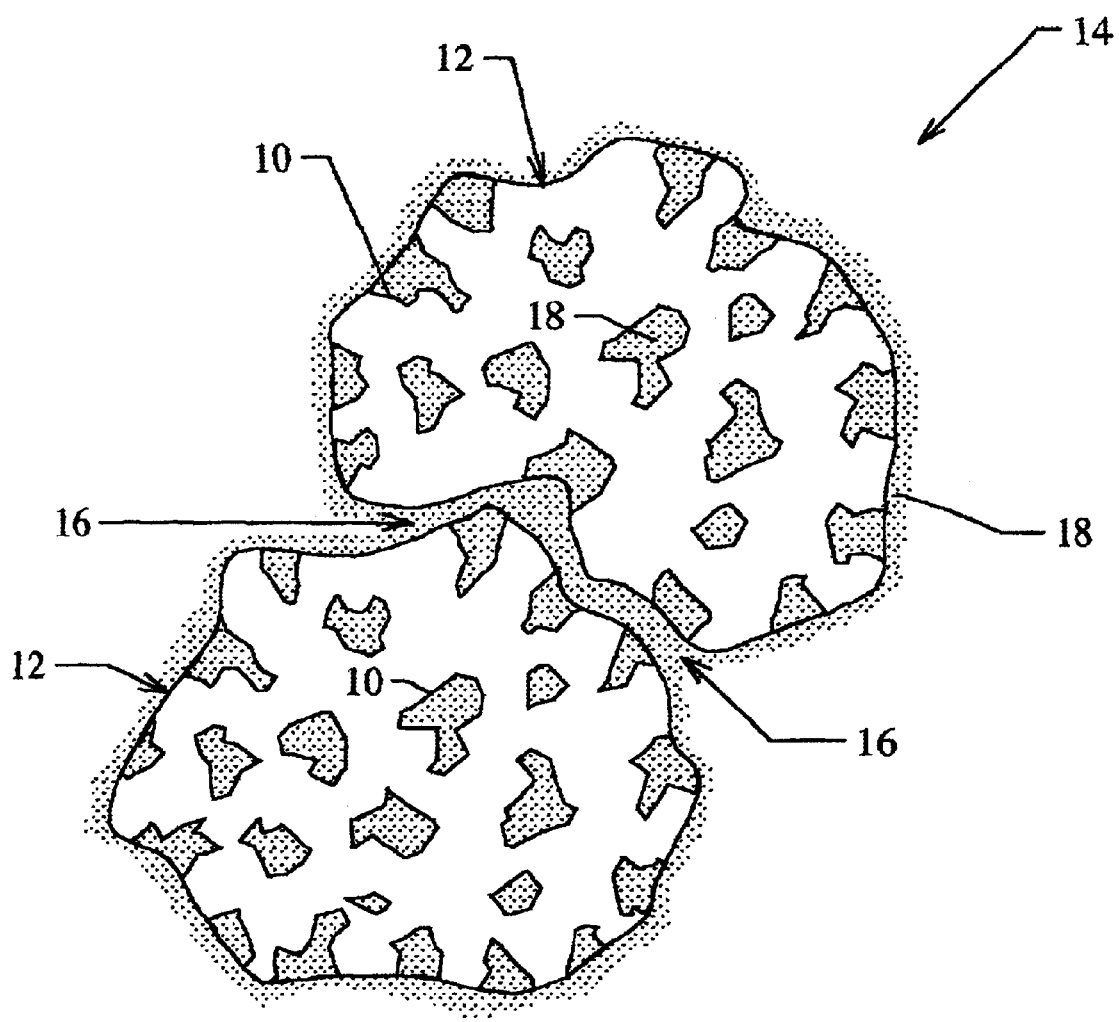
FIG. 1 is a schematic representation of porous rock particles bound by cement in an aggregate prepared according to conventional mixing practices.

This invention is based on the discovery that saturating a porous-rock material with the required amount of water for full hydration and varying the order of addition of the water and cement components when mixing them with the porous-rock particles to form a composite structure results in an aggregate with greater structural strength and insulating properties than previously known. Referring to FIG. 1, a cross-section of a portion of a typical prior-art cement/porous-rock aggregate is shown to illustrate the interface between the various components. When the rock and cement are mixed substantially dry according to conventional practice, the loose cement powder penetrates the voids 10 in the rock particles 12 before appreciable wetting occurs. The well mixed blend is then combined with water to start the hydration process in the cement that binds the rock particles 12 together. During such saturation of the blend with water, the suspended cement particles are further drawn into the voids 10. The result is a composite structure 14 where the space 16 between the rock particles 12 and all interstitial spaces 10 is filled with cement material 18. Mixing cement with pre-wetted but not fully saturated porous rock causes the same action of drawing cement particles into the voids and away from the bonding surface of the rock. The layer of cured cement 18 in the space 16 between adjacent surfaces of the particles 12 provides the binding agent that holds the particles together and produces the agglomerated structure. The cement material in the voids 10, on the other hand, functions primarily as a filler and has little effect in binding rock particles to form the agglomerate.

The heart of this invention lies in the discovery that the binding action of cement on porous rock particles can be improved by modifying the process followed while mixing the ingredients that make up the composite material. For the purpose of defining the present invention, "saturating" porous material in water is intended to mean immersing the material so that the water permeates and fills substantially all voids in the pores of the material; and further that the water is used in an amount sufficient to fully hydrate the cement intended to be used in the mixture being prepared, but with no or negligible excess water. The terms "pore" and "porous" refer to small interstices admitting absorption or passage of liquid. The term "rock" is meant to refer to solid mineral matter. The term "aggregate" is used to refer to a body formed by the collection of units of material particles. The term "flowable slurry" refers to an uncured concrete mixture having sufficient flowability to allow its pouring and forming even in the absence of excess water. Finally, the term "slump" is used here within the meaning of the associated ASTM Test C 143. According to the test, a sample of freshly mixed concrete is placed and compacted by rodding in a mold shaped as the frustum of a cone. The mold is raised, and the concrete allowed to subside. The distance between the original and displaced position of the center of the top surface of the concrete is measured and reported as the slump of the concrete.

In conventional concrete applications, low slump (½" or less) is undesirable because it is an indication of inadequate water for hydration, which adversely effects strength. High slump (5"–7") is also less than desirable in many applications because excessive water loss through evaporation causes shrinkage, which in turn may produce cracks which again adversely effect strength and appearance. Very high slump concrete (9" or greater) often lacks the cohesiveness required for proper forming and separates prior to curing, producing a nonuniform and further weakened concrete mass.

According to the invention, the porous rock particles 12 are first thoroughly wetted by immersion in water to allow the interstitial spaces 10 to become saturated prior to mixing with the cement powder 18. The amount of water used is selected to produce full hydration of the cement, so that no additional water is required to be added during or after mixing. For the purposes of the invention, it is important that no excess water be used because it produces an increase in hydrostatic pressure in the forms as well as a corresponding loss of cement particles at the rock surface during the curing step. Obviously, the presence of negligible amounts of excess water cannot be avoided as a practical matter because of the limited quality control available at a construction site.

Figure 2:
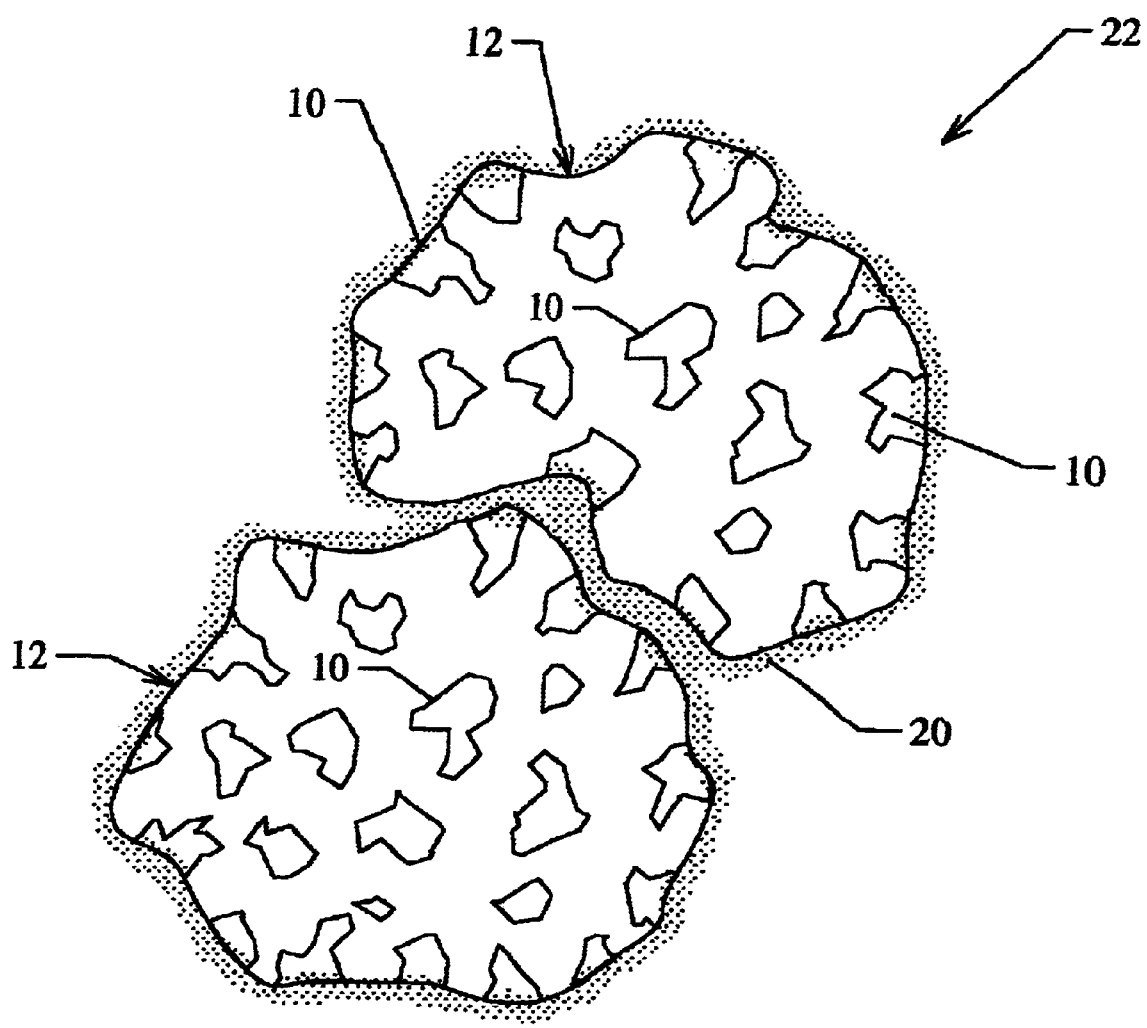
FIG. 2 is a schematic representation of porous rock particles bound by cement in an aggregate prepared according to the process of the invention.

This initial step produces a flowable water/rock slurry into which the cement is then added in a separate, subsequent step. As illustrated in FIG. 2, under these conditions the water in the voids 10 for the most part prevents the cement particles from penetrating the voids during mixing of the cement with the slurry and only a cement layer 20 is formed enveloping each rock particle 12. I found that the water used to saturate the porous rock in the initial step retains, prior to setting of the mixture, sufficient flowability of the slurry after the subsequent addition of the cement to pour and form the mixture as desired. The result is a composite structure 22 that is held together by such cement layers 20 deposited along the surfaces of the rock particles and that, after complete hydration and curing of the cement, contains empty interstitial spaces 10 within the structure of each rock particle. To that end, it is important that no additional water be used after the initial saturation step.

I found that the resulting composite material has greater compressive strength than aggregates prepared by conventional methods, which can be explained by the fact that the water trapped in the voids 10 improves the hydration process of the cement layers 20 during the curing phase and further by the fact that a greater proportion of the cement ends up in the layers 20. In the traditional mixing process, the cement material 18, including that trapped in the voids 10 (see FIG. 1), can only be hydrated during curing by the water that reaches it during the blending step and later when the poured composite is wetted down periodically to improve curing of the cement. As a result, some of the cement particles are not cured properly. By providing an internal reservoir of water trapped in the voids of the porous rock particles, as illustrated in FIG. 2, the composite 22 of the invention ensures that all cement layers 20 between adjacent surfaces are contacted with water for proper hydration and curing both from within and from outside the rock particles.

Moreover, upon complete curing and setting of the cement, the voids 10 of a composite material 22 prepared according to the process of the invention become substantially empty, which further enhances the desirability of the product. The empty spaces reduce the density of the composite, which is very desirable for easing the handling of the material. Because of the water retained in the pores during the initial saturation step, the mixture can contain sufficient water for full hydration and yet be poured drier than conventional concrete during construction, which also makes it easier to form and results in less slump. In addition, the lighter weight of the poured composite produces less hydrostatic pressure on formed structures, which makes the material safer to pour into forms.

The voids left in the cured composite provide a barrier to heat transfer which reduces the thermal conductivity of the formed structure, which is also very desirable for housing and similar construction applications. Because of its greater insulating properties, the material is subject to less expansion and contraction during temperature cycles, which in turn reduces cracking over time, as well.

Working with porous rock such as volcanic cinder, scoria or pumice, I found that stirring the porous rock particles in water for about 10 to 20 seconds (longer times are needed for larger rock particles) is sufficient to saturate the interstitial spaces of the particles to the degree necessary for good results in wetting the cement also from within during hydration. The water is used in an amount sufficient to fully hydrate, according to conventional hydration practice, the cement to be mixed with the porous rock. After such saturation step, the slurry is thoroughly mixed with the cement for about 20 seconds and with any additional fillers that may be desired (such as foams or other porous or nonporous rock material) to produce a blend of flowable composite material ready for pouring. So long as the material is continuously blended, it remains flowable and it can be poured within 30 to 60 minutes without appreciable loss in the properties described above.

For the purposes of this disclosure, cement is defined, as commonly understood in the trade, as a powder of alumina, silica, lime, iron oxide, and magnesia burned together in a kiln and finely pulverized and used as an ingredient of mortar and concrete, or all variations known in the field of construction. The terms cinder and scoria are understood to refer to particulate volcanic rock, such as pumice, as well as to slag or refuse from melting of metals or reduction of ores. Finally, bottom ash is intended to refer to granular solid particles of noncombustible material (ash) resulting from burning of solid fuel such as coal.

I found that a porous-rock to cement weight ratio in the range of about 8:1 to 1:1 produces a composite material with acceptable structural strength, with approximately 6.5:1 to 4:1 being a preferred range, and about 4:1 being optimal for strength for construction purposes. Increasing the amount of cement from the optimal ratio produces gains in strength, but also results in loss of insulating properties, which is undesirable for common construction applications. On the other hand, increasing the amount of rock produces a weaker, but more insulating composite.

The strength of composite structures manufactured with the process of the invention was compared with composites produced by the conventional method, where the rock and cement were first mixed and then thoroughly wetted. The porous rock used for the tests consisted of volcanic cinder, which is a porous material similar to but heavier than scoria and pumice, and bottom ash obtained as a byproduct of power-plant coal-furnace operations. The ratio used in all cases was 50 lb of rock, 8 lb of Portland cement (or, equivalently, generic hydraulic cement) and 9 lb of water (yielding a rock to cement ratio of 6.25:1). Though not optimal for structural strength, these proportions were found to yield a level of compressive strength that is acceptable for construction applications at a more favorable cost than the optimal 4:1 ratio. Therefore, a porous rock to cement ratio of about 6:1 is preferred. The components were mixed in quantitatively-identical batches.

For Sample 1, prepared according to the invention, cinder rock was first soaked in the water for about 10 seconds and then the cement was added while stirring thoroughly. The resulting slurry was cast in two equal forms approximately 0.2 ft$^3$ in volume within a few minutes after blending.

For Sample 2, prepared according to the conventional process, the cinder rock and cement were first blended dry to produce a uniform mixture and then soaked in the water while stirring thoroughly. The resulting slurry was cast in the same type of form (0.2 ft$^3$ in volume) within a few minutes after blending to provide two representative samples.

After seven days of curing side by side under normal ambient conditions, the compressive strength of the samples was measured using ASTM-C39 test standards, yielding the results reported below. It is noted that the seven-day test is a standard marker of progress during curing of cement agglomerates, such as concrete, although full curing normally takes about four weeks. Accordingly, 14-day and 28-day tests are also performed.

| Sample Number | Compressive Strength, psi |
| --- | --- |
| 1 | 200 |
| 2 | 110 |

The same tests were performed 14 days after pouring using bottom ash (Samples 3 and 4 according to the invention; Samples 5 and 6 according to the conventional process) in the same proportions by weight, yielding these results:

| Sample Number | Compressive Strength, psi |
| --- | --- |
| 3 | 800 |
| 4 | 880 |
| 5 | 660 |
| 6 | 600 |

Finally, another test was performed 28 days after pouring using bottom ash (Sample 7 according to the invention, Sample 8 according to standard practice) in the same proportions by weight detailed above, yielding the following compressive-strength data:

| Sample Number | Compressive Strength, psi |
| --- | --- |
| 7 | 1,560 |
| 8 | 1,380 |

Following the normal progression of compressive-strength rise during curing, it is expected that the cinder samples would have reached strengths comparable to the ones measured for bottom ash if also allowed to cure for 14 or 28 days.

These examples using different porous rocks show clear improvement in the compressive strength of the composite materials prepared using the process of the invention. While these values are much smaller than typically measured for concrete (2,000 to 6,000 psi after full cure), they are sufficiently high for home construction and similar purposes.

These tests also confirmed the theory that the process of the invention entraps water in the rock voids that is slowly consumed during curing of the cement, thereby leaving empty spaces that improve the thermal insulating properties of the material. After seven days of curing under the same ambient conditions, Sample 1 weighed 15.2 lbs, while Sample 2 weighed 14.6 lbs, showing a difference of about 0.6 lbs from water still trapped in the interstitial spaces of the porous rock particles of the sample prepared according to the invention. After four weeks of curing, the two samples weighed about the same.

Figure 3:
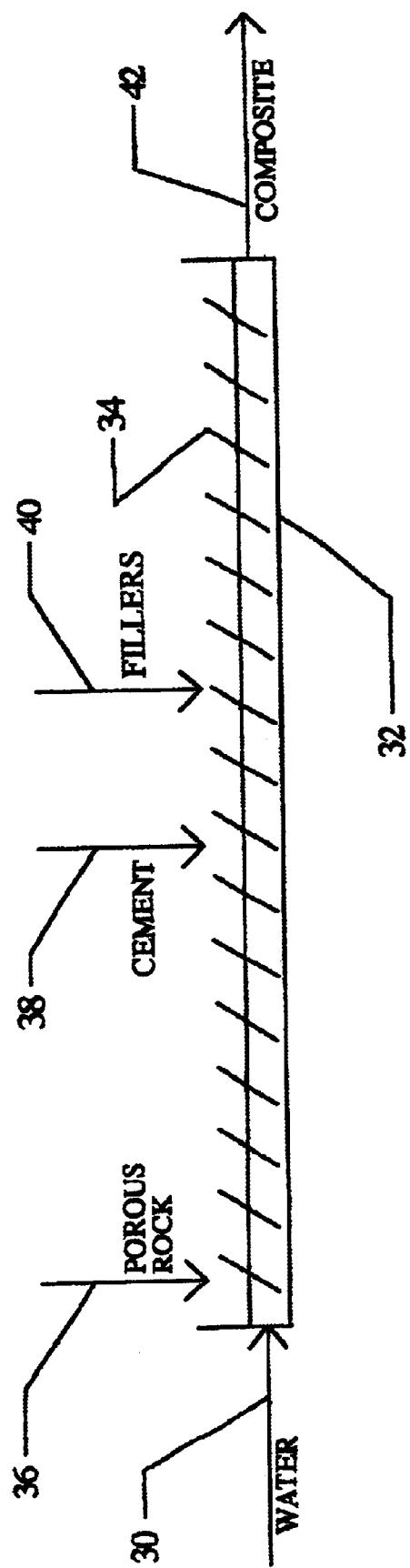
FIG. 3 is a schematic representation of a continuous-flow embodiment of the process of the invention.

It is noted that the concept of the invention is well suited for implementation as a continuous process, as illustrated schematically in FIG. 3. A stream of water 30 is passed through a channel or trough 32 equipped with a mixing screw 34 at a rate adapted to provide a residence time of at least approximately 40 seconds, the time shown to be sufficient for good hydration and blending. Porous rock 36 is dumped into the initial portion of the trough 32 and allowed to become saturated with water while stirred by the mixing screw 34 and floated downstream. Approximately half way through the trough 32, cement 38 is added to the slurry and blended with the rock on the way out along the trough. The water 30, rock 36 and cement 38 are obviously added in the proportions required to obtain the desired composite material. Additional materials, such as fillers 40, may also be added with or after the addition of the cement to vary the characteristics of the product. Upon exiting the trough 32, the flowable slurry of composite material 42 is ready for pouring into construction forms on a continuous basis.

It is believed that the process of the invention would improve the strength of any composite material that is produced with porous particles and a binder that is activated by blending with a liquid. Thus, any porous rock aggregated by cement or other liquid- or water-reactive binder would benefit by pre-saturating the porous particles prior to blending them with the binder. Obviously, though, the strength of the resulting composite material is limited by the characteristics of the porous rock used. For example, I found that perlite and vermiculite, mixed with cement and water in the same proportions given above, produces composites with compressive strengths of 65 psi and 55 psi, respectively, which are not acceptable for construction applications. It is expected that these properties could be improved by the partial substitution of these components with stronger porous material like bottom ash. Early experiments with foam and similar materials mixed with cement according to the invention have shown promise to produce even lighter and more insulating composite structures.

One very important feature of the invention is the production of a firm, low- or no-slump slurry, which provides great advantages in forming and pouring during construction. Using the proper mixture of water, rock and cement, as deemed appropriate by conventional practice for full hydration, the mixing procedure of the invention yields a pourable slurry that exhibits negligible slump where the prior-art approach produces a slurry with a typical slump value of 1–5 inches. This is obtained by the fact that sufficient hydration water is used in the initial saturation step and no additional water is utilized in the process of the invention. Thus, the resulting slurry does not contain the typical excess water that characterizes conventional concrete mixtures. As such, the slurry of the invention has less hydrostatic head and less slump than standard uncured concrete mixtures.

As well known to those skilled in the art, assuming adequate hydration, the strength of concrete material is typically inversely related to its slump; therefore, a low-slump material is preferred both because of the greater ease with which it can be formed and because of the higher-quality concrete it produces. As is also well understood in the art, the addition of water during the preparation of the concrete slurry should in all cases be limited to the amount required to fully hydrate the cement and at the same time produce a flowable slurry. In conventional practice, the water cannot be stored in the pores of the rock because they are already filled with cement particles; instead, the water remains outside the rock particles. Thus, the water required for hydration produces a mixture with relatively high overall fluidity, slump and hydrostatic pressure, and the resulting slurry is harder to control during the curing phase. The present invention, on the other hand, by virtue of storing a portion of the hydration water in the rock pores, yields a firmer slurry that produces a stronger, easy-to-work, negligible-slump concrete mixture.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. A process for making a solid composite structure from a porous material and a cement binder activated by water, comprising the following steps:
    (a) saturating the porous material in water;
    (b) blending the cement binder with the porous material saturated in water, thereby producing a slurry of composite material;
    (c) pouring the slurry into a form adapted to produce said composite structure; and
    (d) allowing the cement binder to fully cure;
        wherein step (a) is carried out prior to step (b); the water in step (a) is used in a quantity sufficient to produce full hydration of the cement binder in a slurry that contains no excess water after step (b); and no additional water is used to promote curing of the cement binder during steps (b) and (c).

2. The process recited in claim 1, wherein said porous material is a porous particulate rock.

3. The process recited in claim 2, wherein said porous particulate rock is selected from the group consisting of volcanic cinder, scoria, pumice, bottom ash, or mixtures thereof.

4. The process recited in claim 3, wherein the porous particulate rock and the cement are present in a weight ratio from about 8:1 to 1:1.

5. The process recited in claim 3, wherein the porous particulate rock and the cement are present in a weight ratio from about 6.5:1 to 4:1.

6. The process recited in claim 5, wherein the porous particulate rock is volcanic cinder.

7. The process recited in claim 5, wherein the porous particulate rock is bottom ash.

8. The process recited in claim 1, further comprising the step of adding filler material during step (b).

9. A solid composite structure produced according to the method recited in claim 1.

10. A solid composite structure produced according to the method recited in claim 2.

11. A solid composite structure produced according to the method recited in claim 3.

12. A solid composite structure produced according to the method recited in claim 4.

13. A solid composite structure produced according to the method recited in claim 5.

14. A solid composite structure produced according to the method recited in claim 6.

15. A solid composite structure produced according to the method recited in claim 7.

16. A solid composite structure produced according to the method recited in claim 8.

* * * * *